E. PASSBURG.
PROCESS FOR DRYING GRAIN AND OTHER COARSE GRANULAR MATERIALS.
APPLICATION FILED NOV. 9, 1916.
1,250,496.  Patented Dec. 18, 1917.
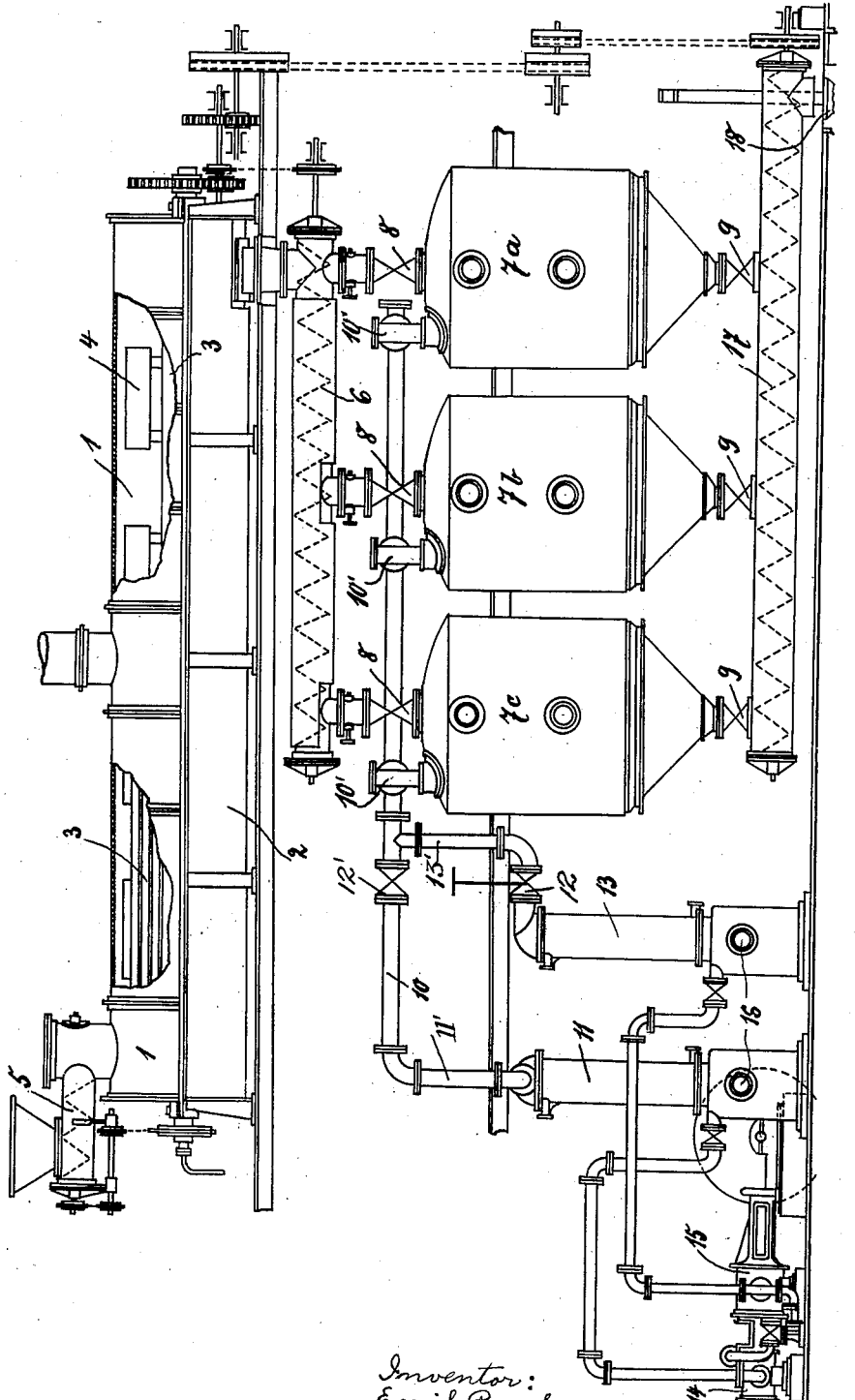
Inventor:
Emil Passburg,
By Hugh K. Wagner,
His attorney.

UNITED STATES PATENT OFFICE.

EMIL PASSBURG, OF BERLIN, GERMANY.

PROCESS FOR DRYING GRAIN AND OTHER COARSE GRANULAR MATERIALS.

1,250,496.  Specification of Letters Patent.  Patented Dec. 18, 1917.

Application filed November 9, 1916. Serial No. 130,458.

*To all whom it may concern:*

Be it known that I, EMIL PASSBURG, a citizen of the German Empire, residing at Berlin, in the Province of Brandenburg and Kingdom of Prussia, have invented certain new and useful Improvements in Processes for Drying Grain and other Coarse Granular Materials, of which the following is a specification, reference being had therein to the accompanying drawing.

It is known that it is not economical to dry grain by blowing hot air through it, as the useful effect of the heat is incomplete. Even if dry hot air is employed, only a small quantity of moisture evaporates, and only on the surface of the grains, the inner parts thereof remaining moist. When the outside atmosphere is moist, the drying effect is practically nil even when large quantities of heat are led to the grains. It had therefore already been proposed to heat the grain itself to such a degree of heat that the moisture of the grains is exuded, and to make the material pass a sieve-room in order to withdraw the moisture from the surface of the grain by means of air sucked through the grain. But this process also did not prove successful, for the reason that the heating of the grain to a temperature sufficiently high to cause the grain to exude the moisture contained therein required a longer time than would be practical in a continually running work. Besides the grain, if too much heated, deteriorates.

These disadvantages are avoided by employing the drying process constituting the present invention.

This new process of drying consists in heating the grain,—preferably in a continually working process,—in a vessel heated by vapor or by any other means to a temperature of about 60—70° C. This temperature while not injurious to the grains causes only a small part of the moisture to be removed, or evaporated, if the grain is heated under the pressure of the outside atmosphere and not under vacuum. Therefore, according to my process the heated grain is carried continuously into vacuum vessels which are not heated, but which are successively placed under a high vacuum by means of a suitable air pump consequently the moisture evaporates quickly out of the grain owing to the heat stored therein.

If, for instance, the air in the vessel filled with the heated grain, is removed to such a degree that a vacuum of 10 mm. below absolute is gained, whereby water contained in the vessel boils at a temperature of about 20° C., the moisture of the grain is changed into vapor, and this vapor is led from the vessels to condensers under the action of the suction of the air pump.

The evaporation of the water may be continued until the heat stored in the grain is consumed, that is, until the grain is cooled to the temperature of the water boiling point. By this process, the drying is effected not only on the surface, but also at the same time, throughout the inner parts of the grains, due to the fact that the water in the vessel changes into vapor at the vacuum stated thus permitting 80—90 per cent. of the heat carried to the grain being utilized, whereas if drying takes place under atmospheric pressure it is only possible to utilize at most from 10% to 30% of the heat.

In the drawings the single figure is a side elevation partly broken away of an apparatus employed in carrying out the invention.

The pre-drying or heating apparatus consists of rough iron cylinders or troughs 1 with a steam-jacket 2 and an inner revolving heating-body 3 with the transport-shovels 4. The conveyer-worm 5 carries the moist grain to the cylinder 1, from which it falls into the distributing-worm 6, which carries it alternately to the vacuum-vessels $7^a$, $7^b$, $7^c$. These latter have at their upper and lower ends stop-valves 8, 9. Each vessel is connected to a long vapor pipe 10 by branches 10'. The pipe 10 is connected with low and high vacuum condensers 11 and 13 by means of branch pipes 11' and 13' respectively, valves 12 and 12' permitting of one or both of the condensers being used at will. These condensers are connected with a two phase air-pump, of which the cylinder 14 for lower vacuum sucks the air behind the slides, or the valves of the second cylinder 15 for a high vacuum.

To effect a continual drying, the grain is carried, for instance, by the worm 6 into the vessel $7^a$ the latter being preferably under a very low if any vacuum. As soon as this vessel is filled the valve 8 thereof is closed and the corresponding valve of the other vessel $7^b$ is opened, whereupon the grain runs into this vessel. The valve of the vapor-pipe 10' of the vessel $7^a$ is then opened, and the vacuum in vessel $7^a$ raised by means of the air-pump cylinder 14. Then the evaporation of the water takes place, and the vapors which arise, are condensed into water in the condenser 11, this water stream being visible through the observation glasses 16 of the lower collecting vessel.

At a vacuum of, for instance, 60 mm. below absolute in this collecting vessel only a smaller part of the water contained in the grain is evaporated to a cooling of the grain to about 40° C. As soon as the evaporation lessens, the valve 12' of the vapor-pipe 10 is shut and the valve 12 of the branch vapor-pipe 13' is opened, whereby a connection with the condenser 13 and the air-pump cylinder 15 is made. The higher vacuum existing here, causes the water contained in the grain, to boil and evaporate until the grain is cooled down to the boiling point of the water.

In the meantime the vessel 7$^b$ has been filled with hot grain, whereupon the process is carried on in the same way as described, with this vessel and with the vessel 7$^c$, while the valve 9 of the vessel 7$^a$ is opened and the dry grain is led to the worm 17, which carries it into the elevator, from where it may be elevated into the silos or trolleys.

The two air-pump cylinders 14 and 15 are arranged one after the other not only to produce a high vacuum, but also for the purpose of not destroying the high vacuum in one of the three vacuum-vessels, when the air is sucked from one of the newly filled vessels by the cylinder for lower vacuum.

It is evident that from the grain heated under the atmospheric pressure only a limited quantity of moisture may be evaporated, according to the heat stored up in the grains and also that this stored up heat is limited by the fact that the grain cannot be heated beyond a certain temperature without being damaged. Therefore heating of the grain, under the atmospheric pressure is only suitable and adapted in those cases in which the quantity of water which is to be removed is not too large.

What I claim, is:

The herein described process of drying grain consisting in heating the grain by vapor and during a continual working process to a temperature of from 60° to 70° C., feeding the heated grain to a non-heated vessel, subjecting the grain to a low vacuum pressure for a definite period, and then subjecting the grain to a high vacuum pressure.

In testimony whereof I have affixed my signature in presence of two witnesses.

EMIL PASSBURG.

Witnesses:
HENRY HASPER,
ALLEN F. JENNINGS.